United States Patent
Kagitani

(10) Patent No.: US 7,483,563 B2
(45) Date of Patent: Jan. 27, 2009

(54) IMAGE PROCESSING APPARATUS AND METHOD

(75) Inventor: Kenji Kagitani, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 734 days.

(21) Appl. No.: 10/877,695

(22) Filed: Jun. 25, 2004

(65) Prior Publication Data

US 2005/0069194 A1    Mar. 31, 2005

(30) Foreign Application Priority Data

Jun. 27, 2003    (JP) .............................. 2003-183970

(51) Int. Cl.
   *G06K 9/00*    (2006.01)
(52) U.S. Cl. ...................... 382/154; 382/106
(58) Field of Classification Search ............. 348/42–60, 348/E15.001, E13.001, E13.003, E13.02, 348/E13.026, E13.063, E13.064, E13.065, 348/E13.066, E13.067; 382/154, 106
See application file for complete search history.

(56) References Cited

U.S. PATENT DOCUMENTS

| | | | | |
|---|---|---|---|---|
| 5,855,553 | A * | 1/1999 | Tajima et al. ................ 600/407 |
| 6,104,426 | A * | 8/2000 | Street ........................... 348/45 |
| 6,188,058 | B1 * | 2/2001 | Tullis ....................... 250/208.1 |
| 6,747,610 | B1 * | 6/2004 | Taima et al. .................... 345/6 |
| 6,940,473 | B2 * | 9/2005 | Suyama et al. ................. 345/6 |
| 2002/0024517 | A1 | 2/2002 | Yamaguchi et al. |
| 2002/0024592 | A1 * | 2/2002 | Uomori et al. ................. 348/42 |
| 2003/0011618 | A1 * | 1/2003 | Deering ....................... 345/613 |
| 2003/0072487 | A1 | 4/2003 | Fan et al. |

FOREIGN PATENT DOCUMENTS

| | | |
|---|---|---|
| JP | H09-179998 | 11/1997 |
| JP | 2002-032744 | 1/2002 |
| JP | 2000-242157 | 2/2002 |
| JP | 2002056407 A * | 2/2002 |
| JP | 2001-305230 | 11/2002 |
| JP | 2002324249 A * | 11/2002 |
| JP | 2003-099760 | 4/2008 |

OTHER PUBLICATIONS

Simon Stegmaier, Dirc Rose and Thomas Ertl, "A Case Study On The Applications Of A Generic Library For Low-Cost Polychromatic Passive Stereo", 2002, Retrieved fron the Internet:<URL:http://ieeexplore.ieee.org/iel5/8436/26565/01183829.pdf?isnumber=26565&prod=CNF&arnumber=1183829&arSt=557&ared=560&arAuthor=Stegmaier%2C+S.%3B+Rose%2C+D.%3B+Ertl%2C+T.>.*

Japanese Office Action, Notice of Rejection of Japanese Patent Application No. 2003-183970, Issued Dated Apr. 23, 2008 (2 pages).

* cited by examiner

*Primary Examiner*—Sherali Ishrat
(74) *Attorney, Agent, or Firm*—Blakely, Sokoloff, Taylor & Zafman LLP

(57) ABSTRACT

Technology is provided for changing one or more image attributes pertaining to depth perception in a two-dimensional image to emphasize the perceived stereoscopy of the two-dimensional image and achieve a sensation upon viewing the two-dimensional image that is close to a sensation perceived from viewing a binocular stereoscopic image. Binocular stereoscopic image data including image data from two perspectives, for right vision and left vision, are input. A user selects the preferred one of the right vision image data and the left vision image data using an image selection unit, a planar image generating unit extracts the selected image data from the binocular stereoscopic image data, and an image output unit outputs the extracted planar image data.

10 Claims, 6 Drawing Sheets

FIG.3

STEREOSCOPY EMPHASIZING PROCESS

| IMAGE ATTRIBUTE | OBJECT DISTANCE | |
|---|---|---|
| | NEAR | FAR |
| CHROMA | HIGH | LOW |
| SPATIAL FREQUENCY CHARACTERISTIC | HIGH | LOW |
| APPARENT SIZE | LARGE | SMALL |
| CONTRAST | HIGH | LOW |

IMAGE PROCESSING APPARATUS AND METHOD

The present application claims priority to the corresponding Japanese Application No. 2003-183970, filed on Jun. 27, 2003, the entire contents of which are hereby incorporated by reference.

BACKGROUND OF THE INVENTION

1. Field of the Invention

The present invention relates to an image processing apparatus that generates a two-dimensional image from binocular stereoscopic image data including image data from multiple perspectives.

2. Description of the Related Art

In one prior art example, a method of displaying a binocular stereoscopic three-dimensional image involves presenting a right/left vision binocular image made up of images from differing perspectives of which image is divided with respect to a viewer's right vision and left vision to thereby provide binocular parallax and enable stereoscopic vision. As an example of a method of generating a two-dimensional image from an arbitrary perspective based on such a three dimensional image, a method of generating a two-dimensional image that has a seemingly natural appearance is proposed, for example, in Japanese Laid-Open Patent Application No. 2002-324249 and Japanese Laid-Open Patent Application No. 2002-56407.

When viewing a binocular stereoscopic image, depth perception owing to binocular parallax is in effect in addition to normal depth perception from viewing a two-dimensional image. Thereby the viewer feels a sensation that is different from that felt upon viewing a normal two-dimensional image.

The two-dimensional image generation methods described in Japanese Laid-Open Patent Application No. 2002-324249 and Japanese Laid-Open Patent Application No. 2002-56407 merely involve reproducing a two-dimensional image from a given perspective within a space, and thereby, a sensation perceptually similar to that felt upon viewing a binocular stereoscopic image as described above cannot be felt upon viewing a two-dimensional image produced according to these methods.

SUMMARY OF THE INVENTION

An image processing apparatus and method are described. In one embodiment, the image processing apparatus, comprises: an image input unit to input binocular stereoscopic image data including image data of a plurality of different perspectives, a planar image generating unit to generate planar image data based on the binocular stereoscopic image data, and an image output unit to output the planar image data, wherein the planar image data generated by the planar image generating unit corresponds to the image data of one of the different perspectives.

BRIEF DESCRIPTION OF THE DRAWINGS

FIG. 3 is a table showing stereoscopy emphasizing processes according to an embodiment of the present invention;

DESCRIPTION OF THE PREFERRED EMBODIMENTS

Figure 1:
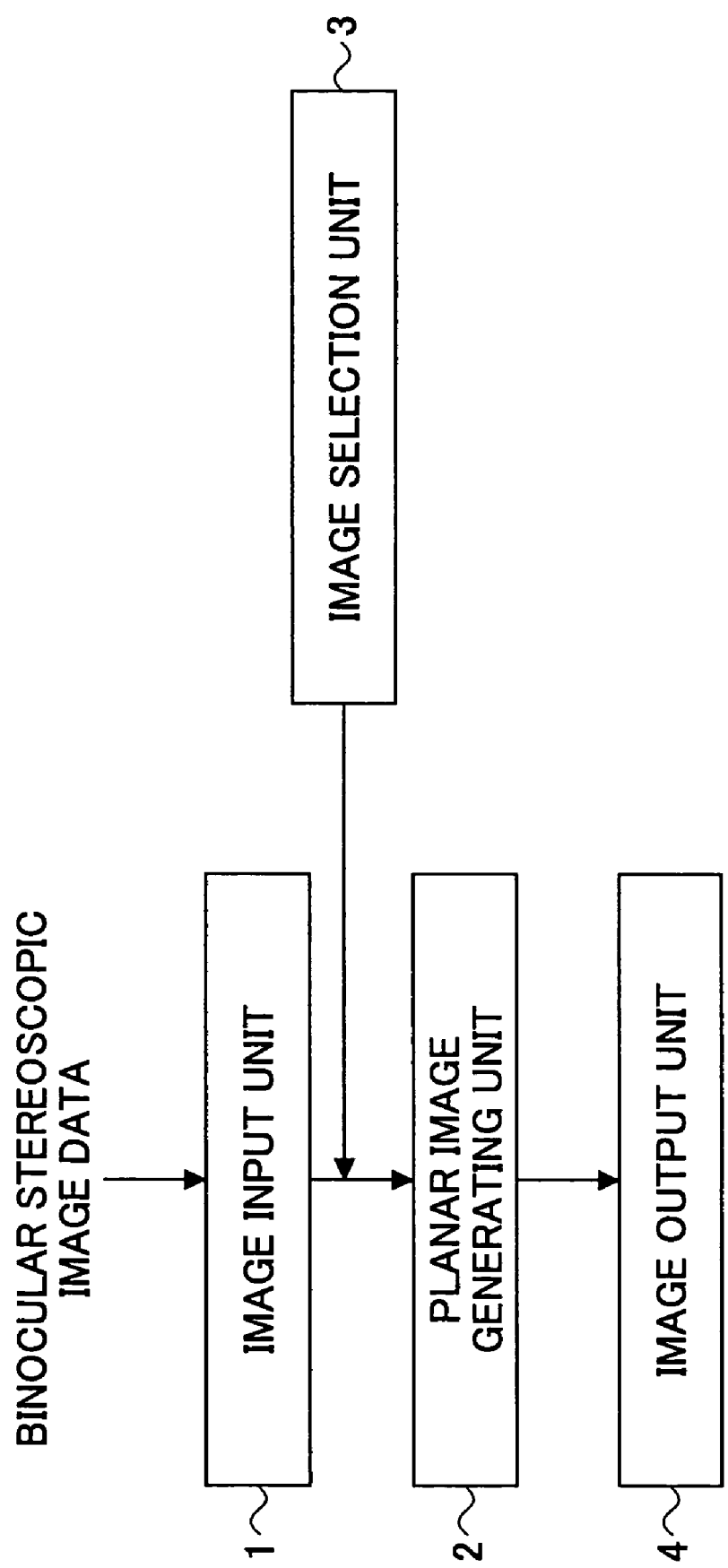
FIG. 1 is a block diagram showing a configuration of an image processing apparatus according to one embodiment of the present invention.

One embodiment of the present invention has been conceived in response to one or more problems of the related art, and comprises an image processing apparatus that is capable of changing one or more image attributes pertaining to depth perception in a two-dimensional image to thereby emphasize the stereoscopy that is perceived in viewing the two-dimensional image and achieve a sensation upon viewing the two-dimensional image that is similar to a sensation felt upon viewing a binocular stereoscopic image.

Another embodiment of the present invention comprises an image processing apparatus that is capable of easily and quickly generating a two-dimensional image from a binocular stereoscopic image.

One embodiment of the present invention comprises an image processing apparatus that includes an image input unit to input binocular stereoscopic image data including image data of a plurality of different perspectives, a planar image generating unit to generate planar image data based on the binocular stereoscopic image data, and an image output unit to output the planar image data, wherein the planar image data generated by the planar image generating unit corresponds to the image data of one of the different perspectives.

According to an embodiment of the present invention, a two-dimensional image may be easily and quickly generated from binocular stereoscopic image data including image data of multiple perspectives.

In one embodiment, the image processing apparatus of the present invention includes an image selection unit for selecting the planar image data to be generated by the planar image generating unit from the image data of the different perspectives. According to an embodiment of the present invention, a user may select a preferred image from image data of multiple perspectives, and a two-dimensional image may be easily and quickly generated.

The present invention according to another embodiment comprises an image processing apparatus including an image input unit to input binocular stereoscopic image data including image data of a plurality of different perspectives, a planar image generating unit to generate planar image data based on the binocular stereoscopic image data, a stereoscopy emphasizing unit to perform a stereoscopy emphasizing process of emphasizing stereoscopy perceived in a planar image corresponding to the planar image data generated by the planar image generating unit, and an image output unit to output the planar image data.

According to an embodiment of the present invention, stereoscopy perceived in a two-dimensional image may be emphasized and a sensation that is close to a sensation perceived from viewing a binocular stereoscopic image may be achieved upon viewing the two-dimensional image.

In one embodiment, the stereoscopy emphasizing process includes a process of changing chroma saturation of each of objects of the planar image generated by the planar image generating unit, the change being relative to a distance of each of corresponding objects of a binocular stereoscopic image corresponding to the binocular stereoscopic image data According to an embodiment of the present invention, stereoscopy perceived in a two-dimensional image may be emphasized and a sensation that is close to a sensation perceived from viewing a binocular stereoscopic image may be achieved upon viewing the two-dimensional image.

In another embodiment, the image processing apparatus of the present invention includes a selection unit for selecting whether to perform the stereoscopy emphasizing process. According to an embodiment of the present invention, a stereoscopy emphasizing process on a two-dimensional image may be stopped when an overly exaggerated or awkward two-dimensional image is generated from emphasizing the stereoscopy or when a user prefers to reduce the time required for image generation, for example.

In another embodiment, the image processing of the present invention includes a stereoscopy manipulation unit for controlling the degree of chroma saturation change and adjusting the degree of stereoscopy emphasis in the stereoscopy emphasizing process. According to an embodiment of the present invention, a user may be able to control the degree of stereoscopy emphasis.

In another embodiment, the stereoscopy emphasizing process includes a process of changing a spatial frequency characteristic of each of objects of the planar image generated by the planar image generating unit, the change being relative to a distance of each of corresponding objects of a binocular stereoscopic image corresponding to the binocular stereoscopic image data According to an embodiment of the present invention, stereoscopy perceived in a two-dimensional image may be emphasized and a sensation that is close to a sensation perceived from viewing a binocular stereoscopic image may be achieved upon viewing the two-dimensional image.

In another embodiment, the image processing apparatus of the present invention includes a stereoscopy manipulation unit for controlling the degree of spatial frequency characteristic change and adjusting the degree of stereoscopy emphasis in the stereoscopy emphasizing process. According to an embodiment of the present invention, a user may be able to control the degree of stereoscopy emphasis.

In another embodiment, the stereoscopy emphasizing process includes a process of changing the size of each of objects of the planar image generated by the planar image generating unit, the change being relative to a distance of each of corresponding objects of a binocular stereoscopic image corresponding to the binocular stereoscopic image data According to an embodiment of the present invention, stereoscopy perceived in a two-dimensional image may be emphasized and a sensation that is close to a sensation perceived from viewing a binocular stereoscopic image may be achieved upon viewing the two-dimensional image.

In another embodiment, the image processing apparatus of the present invention includes a stereoscopy manipulation unit for controlling the degree of size change and adjusting the degree of stereoscopy emphasis in the stereoscopy emphasizing process. According to an embodiment of the present invention, a user may be able to control the degree of stereoscopy emphasis.

In another embodiment, the stereoscopy emphasizing process includes a process of changing the contrast of each of objects of the planar image generated by the planar image generating unit, the change being relative to a distance of each of corresponding objects of a binocular stereoscopic image corresponding to the binocular stereoscopic image data. According to an embodiment of the present invention, stereoscopy perceived in a two-dimensional image may be emphasized and a sensation that is close to a sensation perceived from viewing a binocular stereoscopic image may be achieved upon viewing the two-dimensional image.

In another embodiment, the image processing apparatus of the present invention includes a stereoscopy manipulation unit for controlling the degree of contrast change and adjusting the degree of stereoscopy emphasis in the stereoscopy emphasizing process. According to an embodiment of the present invention, a user may be able to control the degree of stereoscopy emphasis.

In another embodiment, one or more stereoscopy emphasizing processes are performed. According to an embodiment of the present invention, a suitable stereoscopy emphasizing process may be performed.

In another embodiment, the image processing apparatus of the present invention includes a stereoscopy emphasizing process selection unit for selecting one or more of the stereoscopy emphasizing processes. According to an embodiment of the present invention, a user may select a preferred stereoscopy emphasizing process to be performed.

In another embodiment, the image processing apparatus of the present invention includes a stereoscopy manipulation unit for controlling the degree of stereoscopy emphasis for each stereoscopy emphasizing processes to be performed. According to an embodiment of the present invention, a user may be able to select a preferred stereoscopy emphasizing process and control the degree of stereoscopy emphasis.

In another embodiment, the image processing apparatus of the present invention includes a stereoscopy emphasis degree specifying unit for specifying the degree of stereoscopy emphasis, and an adjusting unit for adjusting the degree of change for each process that is to be performed as the stereoscopy emphasizing process according to the specified degree of stereoscopy emphasis. According to an embodiment of the present invention, a stereoscopy emphasizing process at the degree desired by a user may be performed without the user having to perform complicated procedures.

In another embodiment, the image processing apparatus of the present invention includes a planar image data compression unit for compressing the amount of the planar image data generated by the planar image generating unit. According to an embodiment of the present invention, the amount of two-dimensional image data being generated may be reduced.

In another embodiment, the binocular stereoscopic image data includes moving image data. According to an embodiment of the present invention, stereoscopy perceived in a two-dimensional moving image may be emphasized and a sensation that is close to a sensation perceived from viewing a binocular stereoscopic moving image may be achieved upon viewing the two-dimensional moving image.

In the following, preferred embodiments of the present invention are described with reference to the accompanying drawings.

FIG. 1 is a diagram showing a configuration of an image processing apparatus according to one embodiment of the present invention. According to this drawing, an image input unit 1 receives as its input, binocular stereoscopic image data including image data from two perspectives, one for right vision and the other for left vision, for example. A planar image generating unit 2 extracts from the binocular stereoscopic image data image data that may be selected by a user through an image selection unit 3. The user selects a preferred one of the left vision image data and the right vision image data, for example. An image output unit 4 then outputs the extracted planar image data.

According to the present embodiment, a two-dimensional image may be easily and quickly generated from binocular stereoscopic image data including image data from multiple perspectives.

Figure 2:
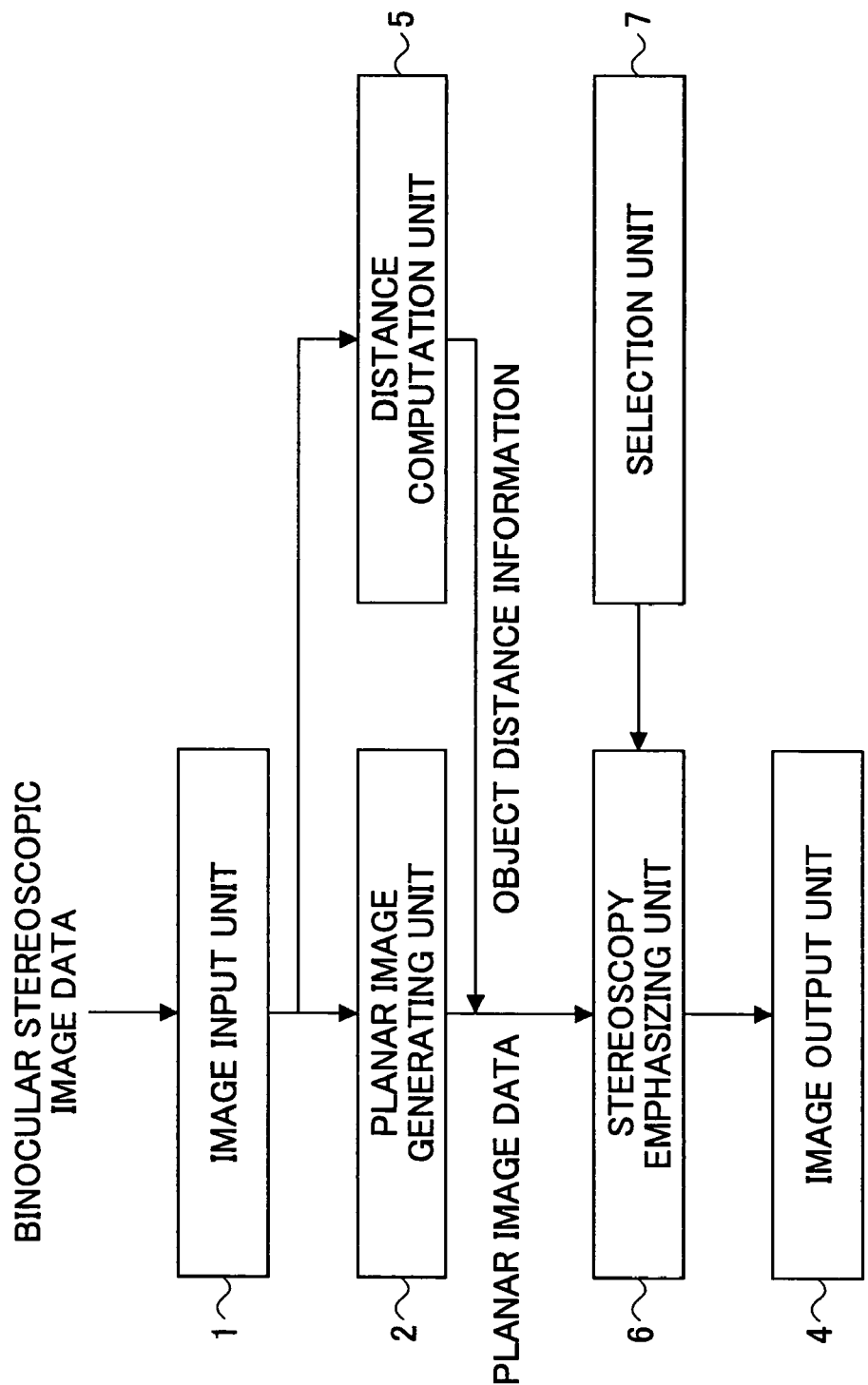
FIG. 2 is a block diagram showing a configuration of an image processing apparatus according to one embodiment of the present invention.

FIG. 2 shows a configuration of an image processing apparatus according to one embodiment of the present invention. According to this figure, the image input unit 1 receives as its input, binocular stereoscopic image data including image data from two perspectives, one for right vision and the other for left vision, for example. A distance computation unit 5 uses the image data from the two perspectives to calculate a parallax angle of each of corresponding points of the two images represented by the image data and calculate a relative position of each point within the three-dimensional space. A specific perspective within the three-dimensional space may be determined by a user who specifies an arbitrary perspective point within the three-dimensional space using a perspective position specifying unit (not shown), for example. In turn, the distance computation unit 5 may be able to obtain the absolute distance from the specified perspective point to each point within the three-dimensional space. The planar image generating unit 2 then generates a two-dimensional image from the specified perspective. A stereoscopy emphasizing unit 6 conducts a stereoscopy emphasizing process on each point within the two-dimensional image according to its distance from the perspective point within the three dimensional space.

It is noted that, in addition to the binocular parallax, image attributes such as chroma saturation, spatial frequency characteristics, apparent size, and contrast can also affect the perceived stereoscopy of an image.

To emphasize the stereoscopy of an image, a decreasing function with respect to the distance of an object from the perspective point (e.g., function inversely proportional to the square of the distance) may be used to change the chroma saturation, the apparent size, and the contrast of the image object. To change the spatial frequency characteristics, a blurring function such as a Gaussian function, e.g.:

$$G(x, y) = a^* \exp(-(x^2+y^2)/2\sigma^2)$$

(where 'a' is a constant)

may be superimposed, for example. More specifically, to emphasize the stereoscopy, an increasing function with respect to the distance of the object from the perspective point (e.g., function proportional to the distance) may be used to change the degree of blurring of the blurring function. When the blurring function corresponds to a Gaussian function, the value a may be controlled using the increasing function with respect to the distance of the object from the perspective point. To change the degree of stereoscopy emphasis, the decrease rate of the decreasing function or the increase rate of the increasing function may be changed to further emphasize the stereoscopy.

In order for the stereoscopy emphasizing unit 6 to emphasize the stereoscopy of the two-dimensional image being viewed, at least one of stereoscopy emphasizing processes such as those listed in the table shown in FIG. 3 is performed. For example, at least one of processes of decreasing the chroma saturation of an object, shifting the spatial frequency to a lower frequency side, decreasing the apparent size of the object, or decreasing the contrast of the object, is performed as the distance of the object from the perspective point increases.

Further, the image processing apparatus according to one embodiment includes a selection unit 7 that enables a user to select whether to perform the stereoscopy emphasizing process. For example, when an overly exaggerated or awkward two-dimensional image is generated by the stereoscopy emphasizing unit 6 emphasizing the image stereoscopy, or when the user prefers to reduce the time required to generate the image, the user may be able to stop the stereoscopy emphasizing process on the two-dimensional image from being performed.

Figure 4:
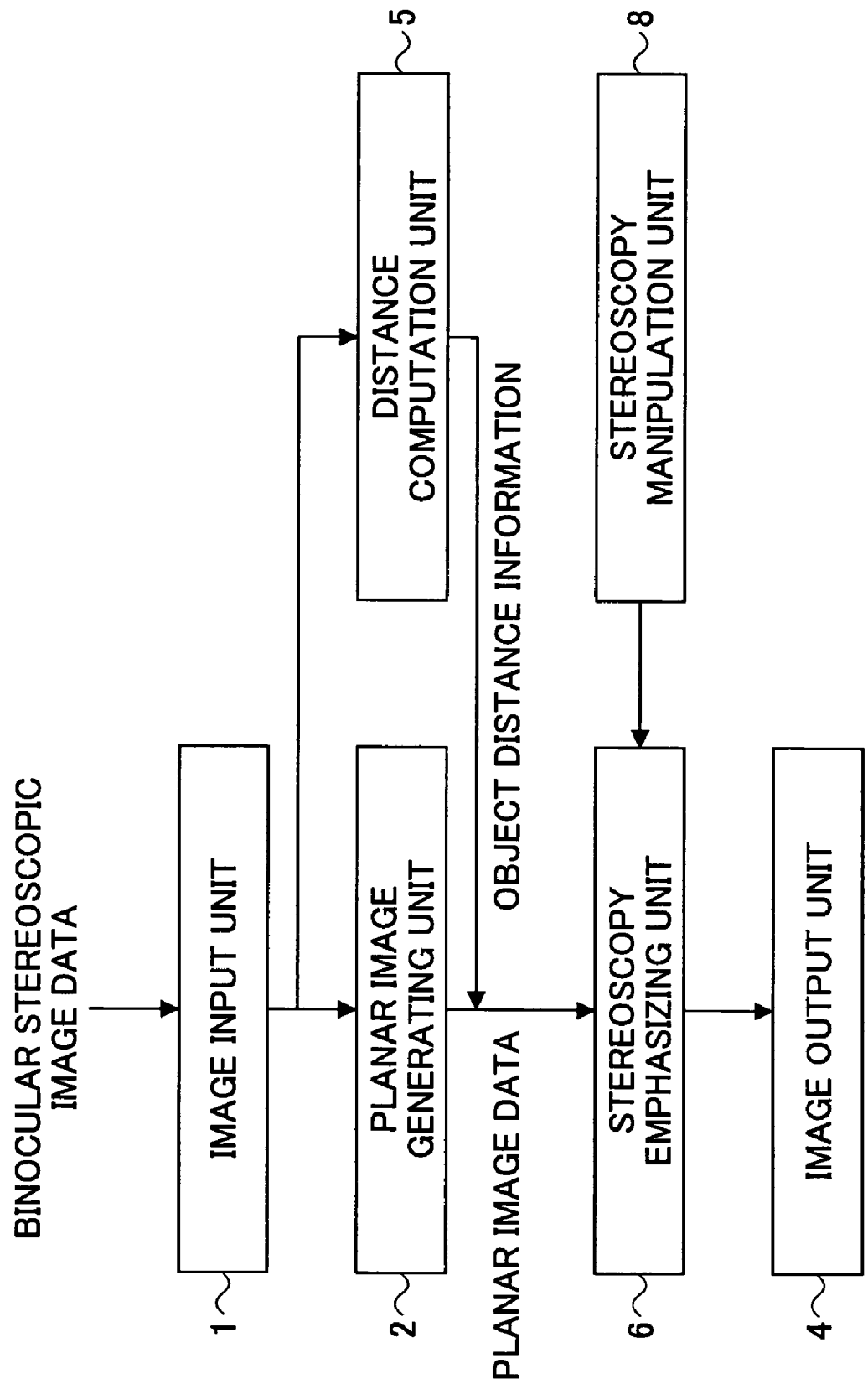
FIG. 4 is a block diagram showing a configuration of an image processing apparatus according to one embodiment of the present invention.

FIG. 4 shows a configuration of an image processing apparatus according to one embodiment of the present invention. The image processing apparatus according to the present embodiment includes a stereoscopy manipulation unit 8 by use of which a user may adjust the degree of change of the image attributes shown in FIG. 3 so as to enable the generation of a two-dimensional image that conforms to the preferences of the user. In this way, the user may be able to control the degree of stereoscopy emphasis.

Figure 5:
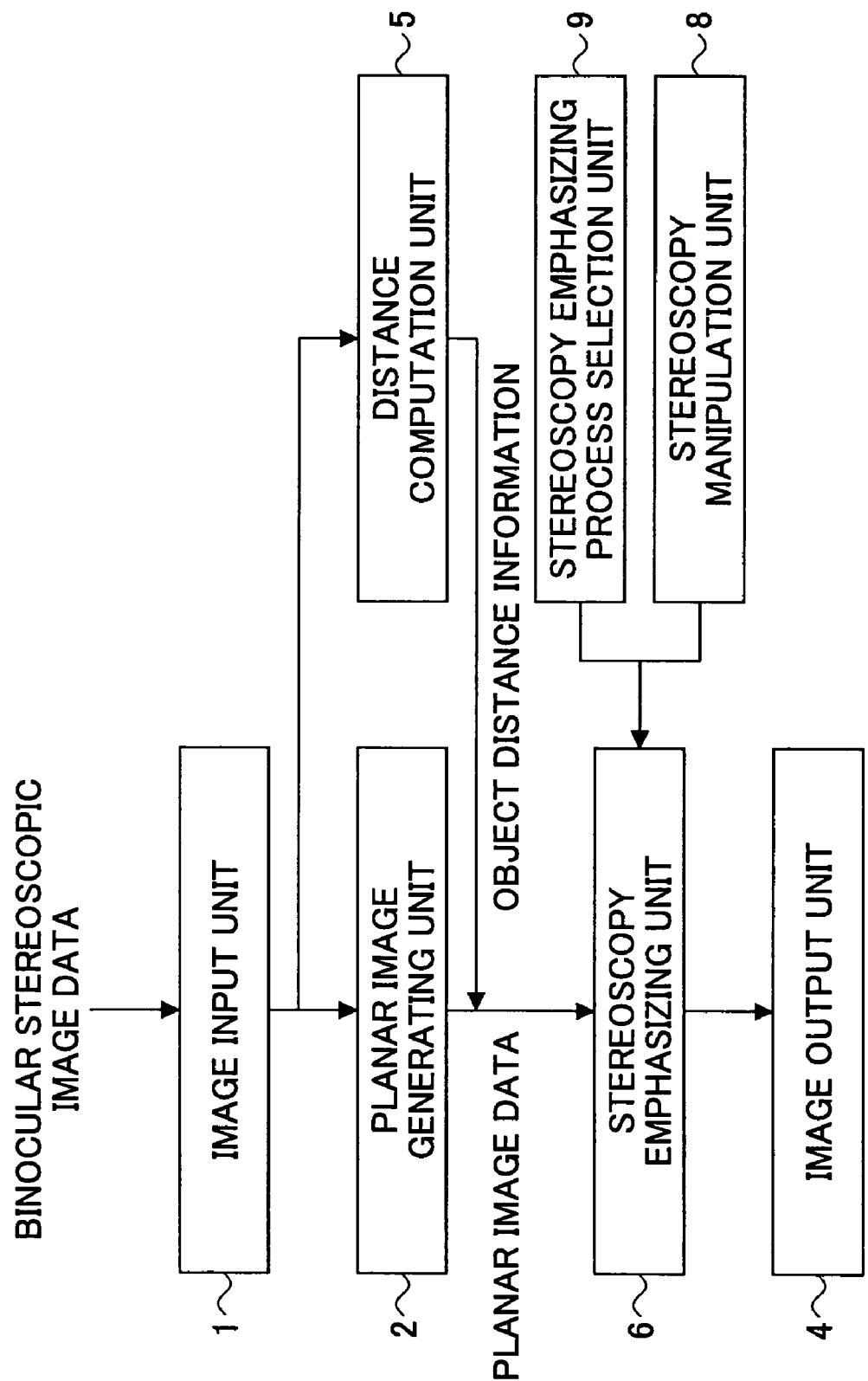
FIG. 5 is a block diagram showing a configuration of an image processing apparatus according to one embodiment of the present invention.

FIG. 5 shows a configuration of an image processing apparatus according to one embodiment of the present invention. The image processing apparatus according to the present embodiment includes a stereoscopy emphasizing process selection unit 9 by use of which a user may select one or more image attributes for the stereoscopy emphasizing process. This embodiment enables adaptation to different situations in which, for example, the user may prefer to perform additional stereoscopy emphasizing processes even if this requires more processing time, or, contrary, the user may prefer to reduce the processing time. With regard to the above embodiment, a processing priority mode and an emphasizing process priority mode may be set, and, for example, in the processing time priority mode, the process of changing the spatial frequency characteristics and the process of changing the apparent size, both of which generally require long processing times, may be omitted.

In the examples according to the above-described embodiments described above with reference to FIGS. 4 and 5, the user manually sets the image attributes (parameters) using the stereoscopy manipulation unit 8; however, the parameters may also be automatically set so that the user may be freed from the trouble of having to perform complicated procedures for setting these parameters. In this case, a stereoscopy emphasis degree specifying unit by use of which the user can specify the degree of stereoscopy emphasis, and an adjusting unit for suitably adjusting each of the stereoscopy emphasizing processes being performed according to the specified stereoscopy emphasis degree may be provided so that stereoscopy emphasis at the degree desired by the user may be automatically performed.

Figure 6:
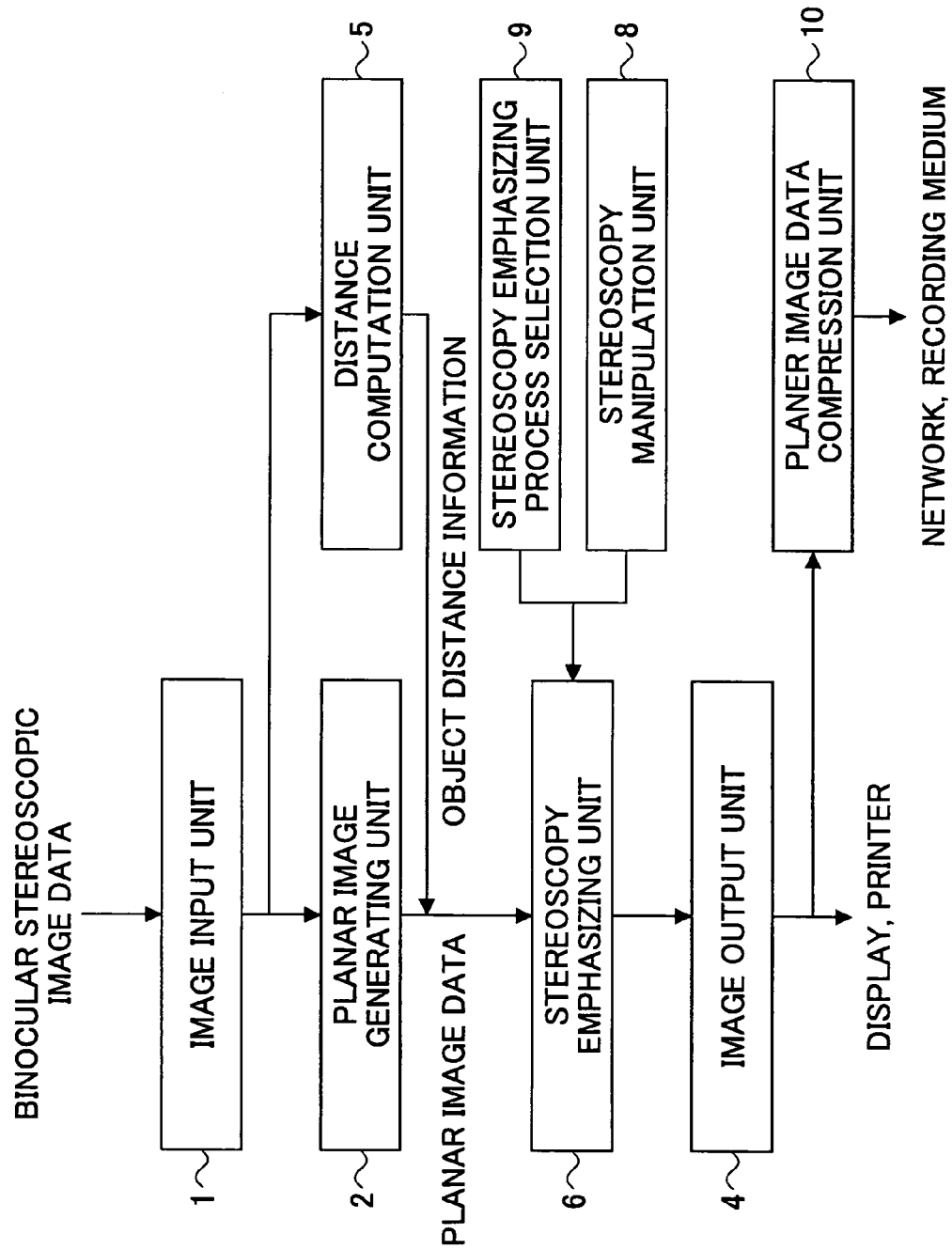
FIG. 6 is a block diagram showing a configuration of an image processing apparatus according to one embodiment of the present invention.

FIG. 6 shows a configuration of an image processing apparatus according to one embodiment of the present invention. According to this embodiment, the generated two-dimensional image is output from the image output unit 4 to be displayed on a display apparatus such as a CRT display, or printed out by an imaging apparatus such as a printer, for example. In other words, the generated two-dimensional image may be output in a format suitable for direct viewing by a viewer. Also, the generated two-dimensional image may be stored in a computer-readable recording medium such as a hard disk or transmitted via a computer network to be used in another apparatus. In such a case, problems may arise such as long transmission time being required for the image transmission owing to the large data amount of the image. Accordingly, the image processing apparatus according to the present embodiment includes a planar image data compression unit 10 for compressing the planar image data to counter such a problem.

Further, it is noted that according to the embodiments of the present invention, the binocular stereoscopic image being input is not limited to still images, and moving images may also be processed in the same manner to emphasize the stereoscopy of the planar moving image generated therefrom.

As can be appreciated from the above descriptions, the following advantages may be realized by the embodiments of the present invention:

(1) a two-dimensional image may be easily and quickly generated from binocular stereoscopic image data including image data from multiple perspectives;

(2) a user may select a preferred image from the image data of multiple perspectives to easily and quickly generate a two-dimensional image;

(3) the stereoscopy perceived upon viewing the two-dimensional image may be emphasized, and a sensation that is close to a sensation felt upon viewing a binocular stereoscopic image may be achieved;

(4) the stereoscopy emphasizing process may be stopped when an overly exaggerated or awkward two-dimensional image is generated by emphasizing the stereoscopy, or when the user prefers to reduce the time required for the image generation;

(5) the user may be able to control the degree of stereoscopy emphasis;

(6) the user may select one or more preferred stereoscopy emphasizing processes and control the degree of stereoscopy emphasis;

(7) stereoscopy emphasis at the degree desired by the user may be conducted without the user having to perform complicated procedures;

(8) the amount of the generated two-dimensional image data may be reduced; and (9) the stereoscopy perceived upon viewing a two-dimensional moving image may be emphasized, and a sensation that is close to a sensation felt upon viewing a binocular stereoscopic moving image may be achieved.

The present application is based on and claims the benefit of the earlier filing date of Japanese Patent Application No. 2003-183970 filed on Jun. 27, 2003, the entire contents of which are hereby incorporated by reference.

What is claimed is:

1. An image processing apparatus, comprising:
    an image input unit to input binocular stereoscopic image data including image data of a plurality of different perspectives;
    a perspective position specifying unit to determine a specific perspective point within a three dimensional space;
    a distance computation unit to calculate an absolute distance from the specific perspective point to each point within the three dimensional space defined by the binocular stereoscopic image data;
    a planar image generating unit to generate a two dimensional image from the specific perspective point based on the binocular stereoscopic image data; and
    a stereoscopy emphasizing unit to emphasize stereoscopic perception in the two dimensional image generated by the planar image generating unit according to the absolute distance within the three dimensional space calculated by the distance computation unit.

2. The image processing apparatus as defined in claim 1, wherein the stereoscopy emphasizing unit emphasizes stereoscopic perception based on a decreasing function or an increasing function with respect to a distance from the specific perspective point to an object.

3. The image processing apparatus as claimed in claim 1, wherein the stereoscopy emphasizing unit is operable to decrease a chroma saturation of an object as a distance from the specific perspective point to the object increases.

4. The image processing apparatus as claimed in claim 1, wherein the stereoscopy emphasizing unit is operable to shift a spatial frequency of an object to a lower frequency side as a distance from the specific perspective point to the object increases.

5. The image processing apparatus as defined in claim 1, wherein the stereoscopy emphasizing unit is operable to decrease a contrast of an object as a distance from the specific perspective point to the object increases.

6. An image processing method, comprising:
    inputting binocular stereoscopic image data including image data of a plurality of different perspectives;
    determining a specific perspective point within a three dimensional space;
    calculating an absolute distance from the specific perspective point to each point within the three dimensional space defined by the binocular stereoscopic image data;
    generating a two dimensional image from the specific perspective point based on the binocular stereoscopic image data; and
    performing a process of emphasizing stereoscopic perception in the two dimensional image according to the absolute distance within the three dimensional space.

7. The image processing method of claim 6, wherein performing the process of emphasizing stereoscopic perception comprises performing the process of emphasizing stereoscopic perception based on a decreasing function or an increasing function with respect to a distance from the specific perspective point to an object.

8. The image processing method of claim 6, further comprising decreasing a chroma saturation of an object as a distance from the specific perspective point to the object increases.

9. The image processing method of claim 6, further comprising shifting a spatial frequency of an object to a lower frequency side as a distance from the specific perspective point to the object increases.

10. The image processing method of claim 6, further comprising decreasing a contrast of an object as a distance from the specific perspective point to the object increases.

* * * * *